US011984645B2

(12) United States Patent
Ma et al.

(10) Patent No.: US 11,984,645 B2
(45) Date of Patent: May 14, 2024

(54) ANTENNA ELEMENT AND ELECTRONIC DEVICE

(71) Applicant: VIVO MOBILE COMMUNICATION CO., LTD., Guangdong (CN)

(72) Inventors: Rongjie Ma, Guangdong (CN); Huan-Chu Huang, Guangdong (CN); Xianjing Jian, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 193 days.

(21) Appl. No.: 17/575,327

(22) Filed: Jan. 13, 2022

(65) Prior Publication Data

US 2022/0140473 A1 May 5, 2022

Related U.S. Application Data

(63) Continuation of application No. PCT/CN2020/102105, filed on Jul. 15, 2020.

(30) Foreign Application Priority Data

Jul. 24, 2019 (CN) ........................ 201910673327.8

(51) Int. Cl.

*H01Q 1/24* (2006.01)
*H01Q 1/48* (2006.01)

(Continued)

(52) U.S. Cl.

CPC ............... *H01Q 1/243* (2013.01); *H01Q 1/48* (2013.01); *H01Q 9/16* (2013.01); *H01Q 21/0006* (2013.01)

(58) Field of Classification Search

CPC ............ H01Q 1/243; H01Q 1/48; H01Q 9/16; H01Q 21/0006; H01Q 1/523; H01Q 9/285;

(Continued)

(56) References Cited

U.S. PATENT DOCUMENTS 6,567,055 B1 5/2003 Oglesby
8,502,746 B2 * 8/2013 Huang .................. H01Q 9/285 343/819

(Continued)

FOREIGN PATENT DOCUMENTS

CN 1825704 A 8/2006
CN 103367875 A 10/2013

(Continued)

OTHER PUBLICATIONS

Takuichi Hirano et al., 60 GHz On-Chip Dipole Antenna with Different Feed, Proceedings of APMC 2012, Dec. 4-7, 2012, p. 304-306, 2D4-01, Kaohsiung, Taiwan.

(Continued)

*Primary Examiner* — Seung H Lee
(74) *Attorney, Agent, or Firm* — IP & T GROUP LLP

(57) ABSTRACT

An antenna element includes: a substrate with a ground plate, a horizontally polarized dipole antenna including a first antenna branch and a second antenna branch, and a first feeding structure. The first antenna branch and the second antenna branch are disposed in the substrate at intervals, the first antenna branch and the second antenna branch are disposed on a plane on which the ground plate is disposed, and the first antenna branch and the second antenna branch are electrically connected to the ground plate through the first feeding structure. The ground plate is spaced apart from both the first antenna branch and the second antenna branch, (Continued)

and a side edge of the ground plate that faces the first antenna branch and the second antenna branch is a concave side edge.

17 Claims, 12 Drawing Sheets

(51) Int. Cl.
*H01Q 9/16* (2006.01)
*H01Q 21/00* (2006.01)

(58) Field of Classification Search
CPC .......... H01Q 19/17; H01Q 21/24; H01Q 1/36; H01Q 1/38; H01Q 1/50; H01Q 19/13
See application file for complete search history.

(56) References Cited

U.S. PATENT DOCUMENTS

| | | | | |
|---|---|---|---|---|
| 8,674,882 B2 * | 3/2014 | Huang | ..................... | H01Q 5/40 343/836 |
| 11,757,195 B2 * | 9/2023 | Huang | ................... | H01Q 21/24 343/818 |
| 2006/0061513 A1 | 3/2006 | Sato | | |
| 2011/0063187 A1 | 3/2011 | Huang | | |
| 2020/0303834 A1 | 9/2020 | Suzuki et al. | | |

FOREIGN PATENT DOCUMENTS

| | | |
|---|---|---|
| CN | 104901004 A | 9/2015 |
| CN | 105186118 A | 12/2015 |
| CN | 109301461 A | 2/2019 |
| CN | 109546326 A | 3/2019 |
| CN | 110401020 A | 11/2019 |
| JP | 2015-091086 A | 5/2015 |
| TW | 201110463 A1 | 3/2011 |
| WO | 2019/077813 A1 | 4/2019 |

OTHER PUBLICATIONS

The First Office Action of Priority Application No. CN 201910673327.8 issued by the Chinese Patent Office dated May 8, 2020.
International Search Report and Written Opinion of International Application No. PCT/CN2020/102105 issued by the Chinese Patent Office dated Oct. 19, 2020.
Extended European Search Report for the European Patent Application No. 20844538.7 issued by the European Patent Office dated Jul. 25, 2022.

* cited by examiner

ANTENNA ELEMENT AND ELECTRONIC DEVICE

CROSS-REFERENCE TO RELATED APPLICATIONS

This application is a Bypass Continuation Application of PCT/CN2020/102105 filed on Jul. 15, 2020, which claims priority to Chinese Patent Application No. 201910673327.8 filed on Jul. 24, 2019, which are incorporated herein by reference in their entirety.

TECHNICAL FIELD

The present disclosure relates to the field of antenna technologies, and in particular, to an antenna element and an electronic device.

BACKGROUND

Currently, antenna forms mainly include a patch antenna, a Yagi-Uda antenna, a dipole antenna, and the like. For a horizontally polarized dipole antenna, a ground plate is generally used as a reflector of the horizontally polarized dipole antenna. However, in a horizontally polarized dipole antenna, a ground plate has a poor reflection effect for an antenna signal, beam transmission performance of the horizontally polarized dipole antenna is poor, and a high directional radiation requirement cannot be satisfied.

SUMMARY

According to a first aspect, an embodiment of the present disclosure provides an antenna element, including:

a substrate, where the substrate has a ground plate;

a horizontally polarized dipole antenna, where the horizontally polarized dipole antenna includes a first antenna branch and a second antenna branch, the first antenna branch and the second antenna branch are disposed in the substrate at intervals, and the first antenna branch and the second antenna branch are disposed on a plane on which the ground plate is disposed; and a first feeding structure, where the first antenna branch and the second antenna branch are electrically connected to the ground plate through the first feeding structure; where the ground plate is spaced apart from both the first antenna branch and the second antenna branch, and a side edge of the ground plate that faces the first antenna branch and the second antenna branch is a concave side edge.

According to a second aspect, an embodiment of the present disclosure provides an electronic device, including the antenna element in the first aspect of the embodiments of the present disclosure.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other accompanying drawings from these accompanying drawings.

DESCRIPTION OF EMBODIMENTS

Figure 1:
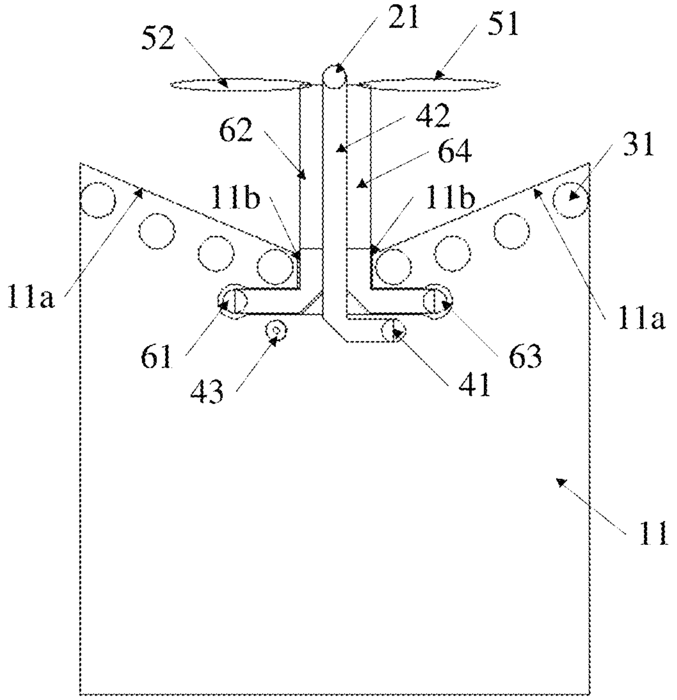
FIG. 1 is a schematic diagram of a planar structure of an antenna element according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art shall fall within the protection scope of the present disclosure.

As shown in FIG. 1 to FIG. 9, an embodiment of the present disclosure provides an antenna element, including:

a substrate 1, where the substrate 1 has a ground plate 11;

a horizontally polarized dipole antenna 5, where the horizontally polarized dipole antenna 5 includes a first antenna branch 51 and a second antenna branch 52, the first antenna branch 51 and the second antenna branch 52 are disposed in the substrate 1 at intervals, and the first antenna branch 51 and the second antenna branch 52 are disposed on a plane on which the ground plate 11 is disposed; and a first feeding structure 6, where the first antenna branch 51 and the second antenna branch 52 are electrically connected to the ground plate 11 through the first feeding structure 6; where the ground plate 11 is spaced apart from both the first antenna branch 51 and the second antenna branch 52, and a side edge of the ground plate 11 that faces the first antenna branch 51 and the second antenna branch 52 is a concave side edge 11*a*.

The first antenna branch 51 and the second antenna branch 52 of the horizontally polarized dipole antenna 5 are transversely (or horizontally) disposed in the substrate 1. For example, the first antenna branch 51 and the second antenna branch 52 may be disposed in the substrate 1 in parallel to the substrate 1, or may be disposed in the substrate 1 with a slight deviation from a parallel direction. A central axis of the first antenna branch 51 and a central axis of the second antenna branch 52 may completely overlap each other, may be slightly offset from each other by an angle, or may be slightly deviated by a distance. A length of the first antenna branch 51 may be equal to or approximately equal to a length of the second antenna branch 52, and the lengths of the first antenna branch 51 and the second antenna branch 52 are approximately a quarter of a dielectric wavelength.

The first antenna branch 51 and the second antenna branch 52 are disposed on a plane on which the ground plate 11 is disposed. In this way, the ground plate 11 may be used as a reflector of the horizontally polarized dipole antenna 5, and can reflect a beam of the horizontally polarized dipole antenna 5.

It should be noted that if the ground plate 11 is disposed in a partial area of the substrate 1, for example, a left area of the substrate 1, a right area of the substrate 1 is a clean area 12, the first antenna branch 51 and the second antenna branch 52 may be disposed in the clean area 12, and the first feeding structure 6 extends from the clean area 12 to an area in which the ground plate 11 is located.

In this embodiment of the present disclosure, a side edge of the ground plate near the horizontally polarized dipole antenna is set to a concave side edge. In this way, a side edge of the ground plate near the horizontally polarized dipole antenna may form a concave reflection surface. Under the action of the concave reflection surface, most beams of the horizontally polarized dipole antenna can be radiated toward a front end, thereby improving a reflection effect of the ground plate for an antenna signal, enhancing beam transmission performance of the horizontally polarized dipole antenna, and enabling the horizontally polarized dipole antenna to satisfy a radiation requirement of high directivity.

Because of strong end-to-end radiation performance, the antenna element in this embodiment of the present disclosure may be disposed as a millimeter-wave antenna element, and is applicable to signal transmission on a 5G millimeter wave band. In other words, the horizontally polarized dipole antenna 5 may be a millimeter-wave antenna, and the lengths of the first antenna branch 51 and the second antenna branch 52 of the horizontally polarized dipole antenna 5 may be set according to millimeter wave wavelengths.

In addition, because the ground plate 11 has a thickness, a concave side edge 11*a* of the ground plate 11 may form a concave reflection surface, so that a structure of the antenna element is more compact, and a size of a dielectric substrate at a front end of the horizontally polarized dipole antenna 5 is relatively small. In addition, the concave reflection surface of the ground plate 11 is similar to a cavity structure. In this cavity structure, the horizontally polarized dipole antenna 5 may be resonated, so that another frequency, such as a frequency of 39 GHz, may be generated, so that the horizontally polarized dipole antenna 5 may cover three frequency bands n257, n260, and n261, and a roaming frequency band may cover a frequency band n258.

In the horizontally polarized dipole antenna 5, shapes of the first antenna branch 51 and the second antenna branch 52 may be rectangular, triangular, or oval. When oval is used, because a change of a shape of the oval is relatively mild, an impedance change of the antenna is more gentle, thereby facilitating expansion of bandwidth of the horizontally polarized dipole antenna 5.

Figure 2:
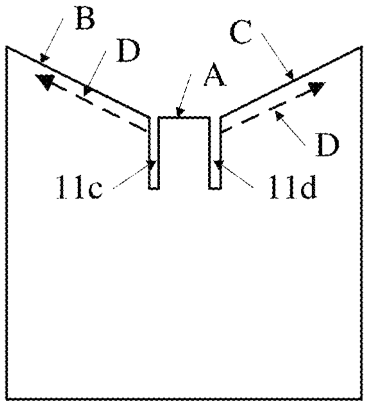
FIG. 2 is a schematic structural diagram of a ground plate according to an embodiment of the present disclosure.

Optionally, a shape of the concave side edge 11*a* of the ground plate 11 is an arc shape, such as a parabolic shape, a hyperbolic shape, an elliptical arc shape, or a circular arc shape. Or, as shown in FIG. 2, the concave side edge 11*a* of the ground plate 11 includes a first straight section A located in an intermediate area and a second straight section B and a third straight section C located in two side areas, an included angle between the second straight section B and the first straight section A is an obtuse angle, and an included angle between the third straight section C and the first straight section A is an obtuse angle. Optionally, the second straight segment B and the third straight segment C are symmetrically disposed about the first straight segment A.

Optionally, the first feeding structure 6 includes:

a first feeding point 61, where the first feeding point 61 is electrically connected to the ground plate 11;

a first feeder 62, where one end of the first feeder 62 is electrically connected to the first antenna branch 51, and another end of the first feeder 62 is electrically connected to the first feeding point 61;

a second feeding point 63, where the second feeding point 63 is electrically connected to the ground plate 11; and a second feeder 64, where one end of the second feeder 64 is electrically connected to the second antenna branch 52, and another end of the second feeder 64 is electrically connected to the second feeding point 64.

In the foregoing feeding structure of the horizontally polarized dipole antenna 5, that is, the first feeding structure 6 may perform feeding through two ends, and amplitudes of signal sources connected to two feeders of each feeding structure are equal, and a phase difference is 180°. In other words, the horizontally polarized dipole antenna 5 may use a differential feeding manner. Differential feeding can improve a common-mode suppression capability and an anti-interference capability of the antenna, improve differential end-to-end isolation, and improve polarization purity. In addition, relative to a single-end feeding structure, radiation power of the antenna can be increased.

Optionally, antenna branches of the horizontally polarized dipole antenna 5 use coaxial differential feeding.

A main composition of the first feeder 62 and the second feeder 64 is: A coaxial wire connects coplanar waveguides (CPW) and is then connected to the first antenna branch 51 and the second antenna branch 52.

Optionally, the ground plate 11 is provided with a first feeder slot 11*c* and a second feeder slot 11*d* that communicate with the concave side edge 11*a*.

The another end of the first feeder 62 is electrically connected to the first feeding point 61 through the first feeder slot 11*c*, the another end of the second feeder 64 is electrically connected to the second feeding point 63 through the second feeder slot 11*d*, and there is a gap 11*b* between the ground plate 11 and each of the first feeder 62 and the second feeder 64. A width of the first feeder slot 11*c* is greater than a width of the first feeder 62, and a width of the second feeder slot 11*d* is greater than a width of the second feeder 64. The first feeder slot 11*c* and the second feeder slot 11*d* may be through slots, that is, slots that pass through the ground plate 11, or may be slots that do not pass through the ground plate 11. If the first feeder slot 11*c* and the second feeder slot 11*d* do not pass through the ground plate 11, an insulating layer may be disposed in the bottom of the first feeder slot 11*c* and the second feeder slot 11*d*, so that the first feeder 62 and the second feeder 64 are insulated from the ground plate 11.

The first feeder 62 and the second feeder 64 serve as transmission lines of the coplanar waveguide, and the gap 11*b* between the ground plate 11 and each of the first feeder 62 and the second feeder 64 is used to adjust impedance of the transmission line of the coplanar waveguide. For example, impedance of the transmission line of the entire coplanar waveguide is adjusted to approximately 50 ohms. By adjusting the impedance of the transmission line of the coplanar waveguide, it is advantageous to reduce signal reflection, to feed more energy to the antenna for feeding. A size of the gap 11*b* may be determined by factors such as a dielectric layer thickness of the substrate 1, a dielectric constant of the dielectric layer, and a signal line width (that is, widths of the first feeder 62 and the second feeder 64) of the transmission line of the coplanar waveguide.

However, in this embodiment of the present disclosure, for example, the concave side edge 11*a* of the ground plate 11 includes the first straight segment A located in the middle area and the second straight segment B and the third straight segment C located in the two side areas. Because the second straight segment B and the third straight segment C extend gradually from the first straight segment A to a side on which the horizontally polarized dipole antenna 5 is located, and the second straight segment B and the third straight segment C are not used as impedance reference ground of the transmission line of the coplanar waveguide, a part of energy of the first feeder 62 and the second feeder 64 can be coupled to the second straight segment B and the third straight segment C through the gap 11*b*. In this way, the second straight segment B and the third straight segment C form a current path D, as shown in FIG. 2, so that it is more helpful for the horizontally polarized dipole antenna 5 to generate resonance, for example, a frequency point of 39 GHz.

In the antenna element in this embodiment of the present disclosure, only a horizontally polarized dipole antenna may be disposed as a single polarized dipole antenna. The antenna element in this embodiment of the present disclosure may be alternatively disposed as a dual-polarized dipole antenna. An implementation of the dual-polarized dipole antenna is described below.

In this embodiment of the present disclosure, the antenna element may further include:

a vertically polarized dipole antenna 2, where the vertically polarized dipole antenna 2 includes a third antenna branch 21 and a fourth antenna branch 22, and the third antenna branch 21 and the fourth antenna branch 22 are disposed in the substrate 1 at intervals;

a reflector 3, where the reflector 3 includes several reflection pillars 31, and the several reflection pillars 31 are arranged in the substrate 1 at intervals along a parabola; and a second feeding structure 4, where the third antenna branch 21 and the fourth antenna branch 22 are electrically connected to the ground plate 11 through the second feeding structure 4; where the first antenna branch 51, the second antenna branch 52, the third antenna branch 21, and the fourth antenna branch 22 are all located on a side of the parabola where a focus of the parabola is located; and the third antenna branch 21 and the fourth antenna branch 22 are respectively located on two sides of a plane on which the first antenna branch 51 and the second antenna branch 52 are disposed, and the first antenna branch 51 and the second antenna branch 52 are respectively located on two sides of the third antenna branch 21 and the fourth antenna branch 22.

The third antenna branch 21 and the fourth antenna branch 22 of the vertically polarized dipole antenna 2 are vertically disposed in the substrate 1. For example, the third antenna branch 21 and the fourth antenna branch 22 may be disposed in the substrate 1 in perpendicular to the substrate 1, or may be disposed in the substrate 1 with a slight deviation from a vertical direction. A central axis of the third antenna branch 21 and a central axis of the fourth antenna branch 22 may completely overlap each other, may be slightly offset from each other by an angle, or may be slightly deviated by a distance. A length of the third antenna branch 21 may be equal to or approximately equal to a length of the fourth antenna branch 22, and the lengths of the third antenna branch 21 and the fourth antenna branch 22 are approximately a quarter of a dielectric wavelength.

The reflector 3 serves as a reflector of the vertically polarized dipole antenna 2, and a direction in which each reflection pillar 31 is disposed in the substrate 1 should cooperate with the third antenna branch 21 and the fourth antenna branch 22. Therefore, each reflection pillar 31 also needs to be disposed vertically in the substrate 1. For example, each reflection pillar 31 may be disposed in the substrate 1 in perpendicular to the substrate 1, or may be disposed in the substrate 1 with a slight deviation from a vertical direction.

In this embodiment of the present disclosure, a dual-polarized dipole antenna is designed by combining the vertically polarized dipole antenna with the horizontally polarized dipole antenna. In one aspect, a multiple input and multiple output (MIMO) function may be implemented, to improve a data transmission rate. In another aspect, a wireless connection capability of the antenna can be increased, a probability of communication disconnection is reduced, and a communication effect and user experience are improved.

In this embodiment of the present disclosure, because the vertically polarized dipole antenna 2 and the horizontally polarized dipole antenna 5 are staggered in a vertical direction (that is, a direction perpendicular to the substrate 1), a positional relationship between the vertically polarized dipole antenna 2 and the horizontally polarized dipole antenna 5 may not be limited in a horizontal direction (that is, a direction parallel to the substrate 1). For example, the vertically polarized dipole antenna 2 may be located in an area between the horizontally polarized dipole antenna 5 and the reflector 3, or the horizontally polarized dipole antenna 5 may be located in an area between the vertically polarized dipole antenna 2 and the reflector 3, or the vertically polarized dipole antenna 2 and the horizontally polarized dipole antenna 5 may be located in a same vertical plane.

Figure 3:
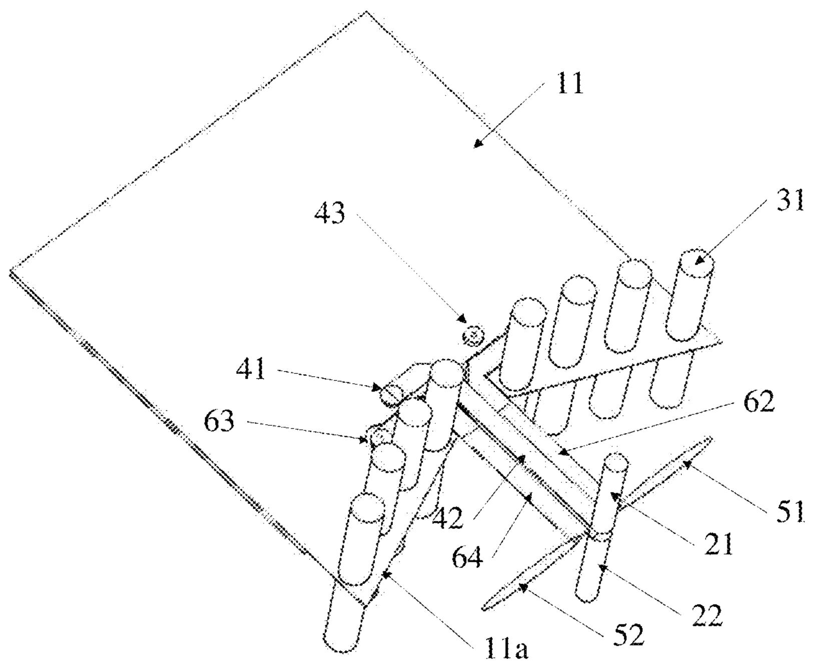
FIG. 3 is a schematic diagram of a three-dimensional structure of an antenna element according to an embodiment of the present disclosure.
Figure 4:
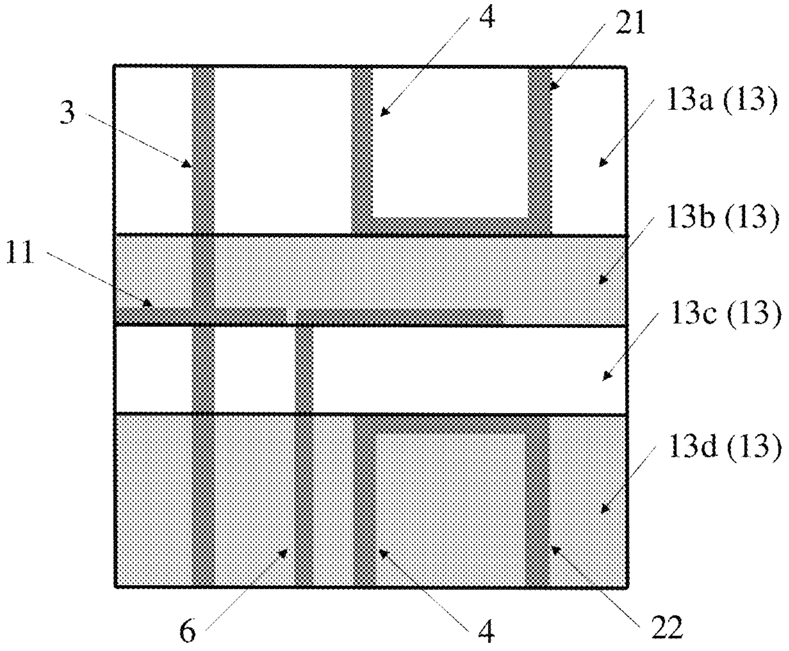
FIG. 4 is a schematic diagram of a sectional structure of an antenna element according to an embodiment of the present disclosure.
Figure 5:
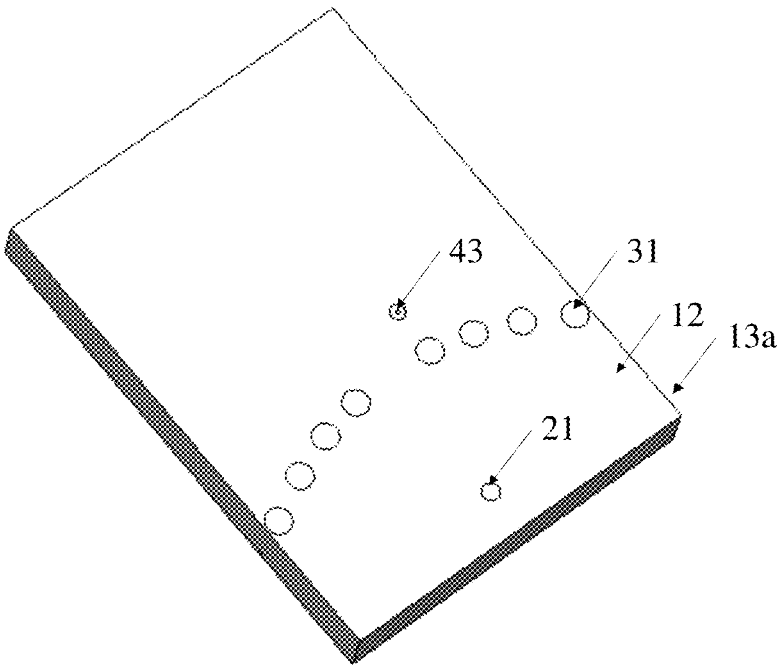
FIG. 5 to FIG. 8 are schematic diagrams of a hierarchical structure of an antenna element according to an embodiment of the present disclosure.
Figure 6:
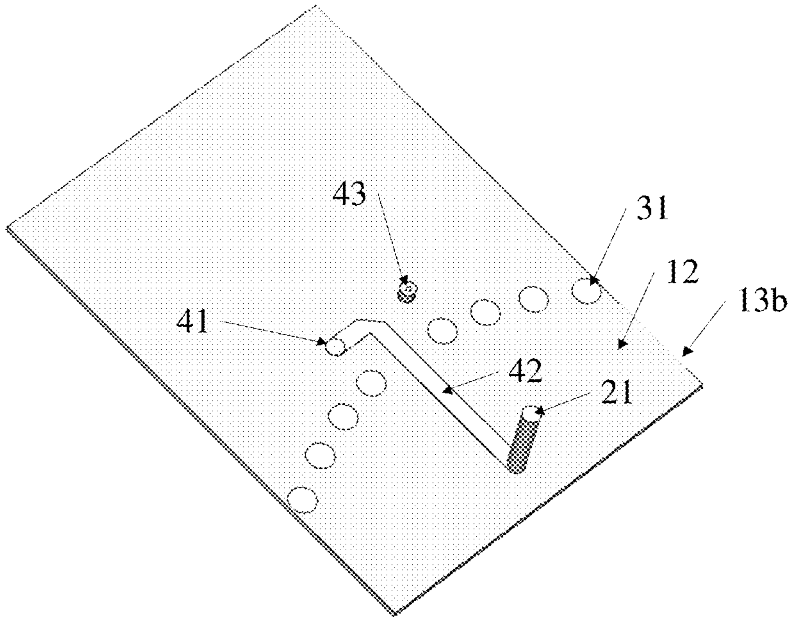
Figure 7:
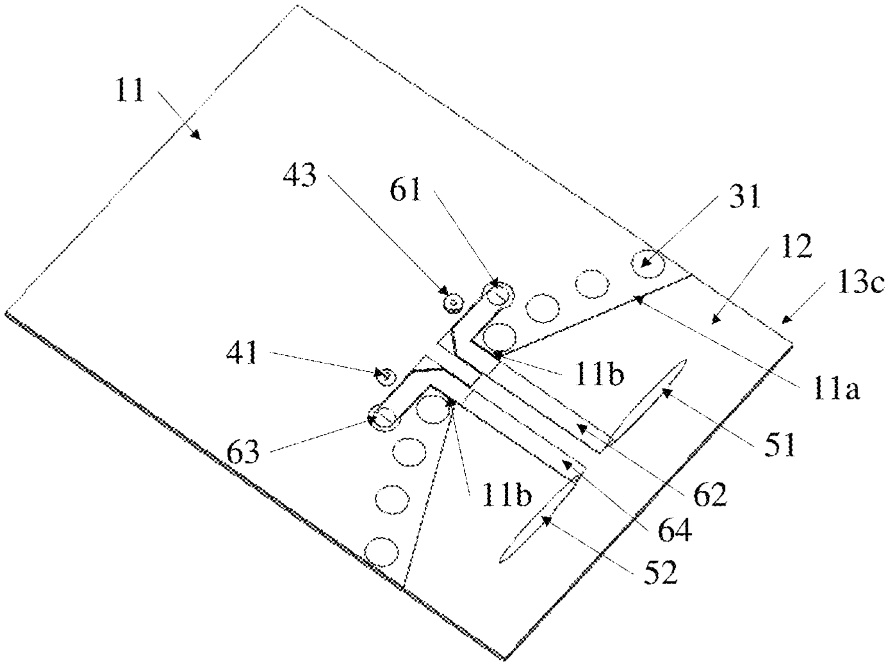
Figure 8:
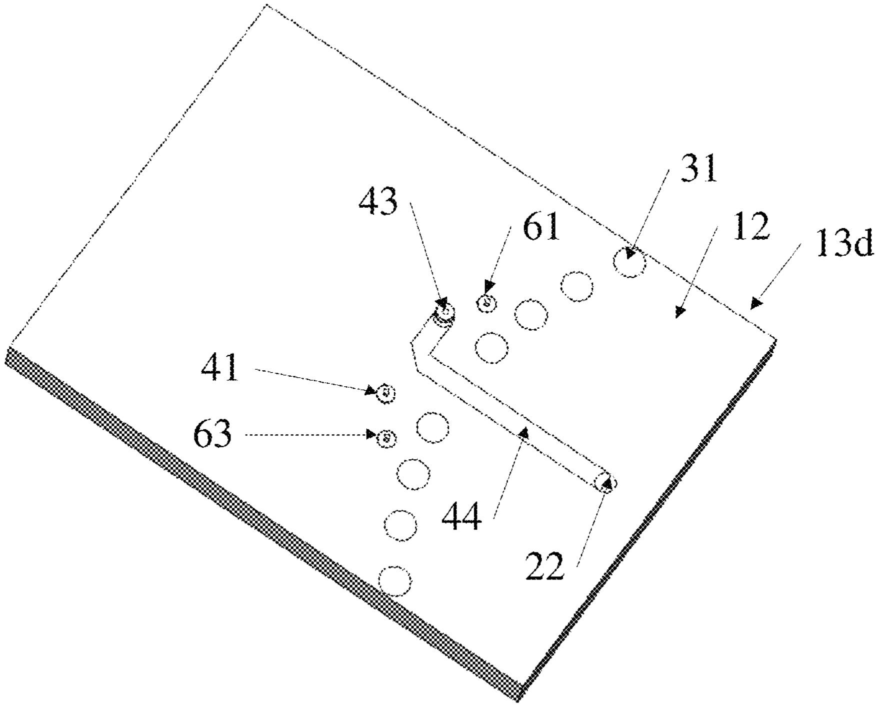
Figure 9:
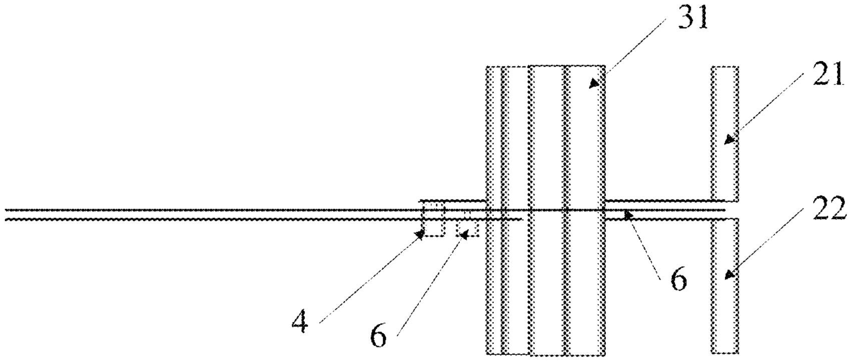
FIG. 9 is a schematic diagram of a side structure of an antenna element according to an embodiment of the present disclosure.

FIG. 1 and FIG. 3 show an implementation in which the first antenna branch 51 and the second antenna branch 52 are located in an area between the vertically polarized dipole antenna 2 and the reflector 3. In this implementation, space of the clean area 12 occupied by the horizontally polarized dipole antenna 5 and the vertically polarized dipole antenna 2 can be saved.

In this embodiment of the present disclosure, the vertically polarized dipole antenna 2 and the reflector 3 arranged along a parabola are disposed in the substrate 1, and the vertically polarized dipole antenna 2 is disposed on a side of the parabola where a focus of the parabola is located, so that a majority of beams of the vertically polarized dipole antenna 2 are radiated toward a front end, and backward radiation is reduced, thereby improving end-to-end radiation performance of the dipole antenna.

Due to strong end-to-end radiation performance, the vertically polarized dipole antenna 2 in this embodiment of the present disclosure may also be a millimeter-wave antenna, to be applicable to signal transmission on a 5G millimeter-wave band. Lengths of the third antenna branch 21 and the fourth antenna branch 22 of the vertically polarized dipole antenna 2 may be set based on millimeter-wave wavelengths.

As described above, the antenna element in this embodiment of the present disclosure may be disposed as a millimeter-wave antenna element, in other words, the vertically polarized dipole antenna 2 and the horizontally polarized dipole antenna 5 are millimeter-wave antennas.

The global mainstream 5G millimeter band defined in the 3rd Generation Partnership Project (3GPP) includes n258 (24.25 GHz to 27.5 GHz) that is mainly 26 GHz, n257 (26.5 GHz to 29.5 GHz) and n261 (27.5 GHz to 28.35 GHz) that are mainly 28 GHz, and n260 (37.0 GHz to 40.0 GHz) that is mainly 39 GHz.

As described above, a structure of the ground plate 11 may enable the horizontally polarized dipole antenna 5 to generate resonance, so that another frequency, such as a frequency of 39 GHz, may be generated. In this way, the horizontally polarized dipole antenna 5 may cover three frequency bands n257, n260, and n261, and a roaming frequency band may cover the frequency band n258. In addition, in a front-end area of a dielectric substrate, several reflection pillars 31 are sequentially arranged at intervals along a parabola. The several reflection pillars 31 are similar to a cavity structure, and may also enable the vertically polarized dipole antenna 2 to generate resonance, so that another frequency, such as a frequency of 39 GHz, may be generated. In this way, the vertically polarized dipole antenna 2 may cover three frequency bands n257, n260, and n261, and a roaming frequency band may cover n258.

Figure 10:
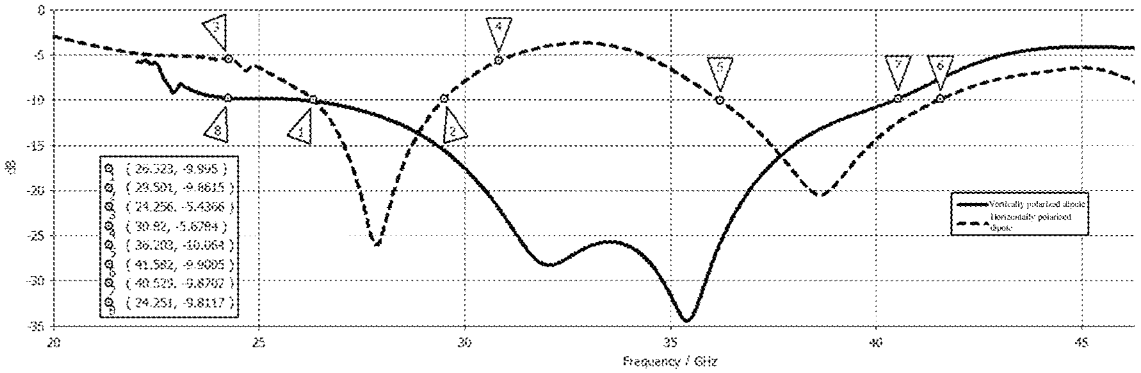
FIG. 10 is a simulated diagram of a reflection coefficient of an antenna element according to an embodiment of the present disclosure.
Figure 11:
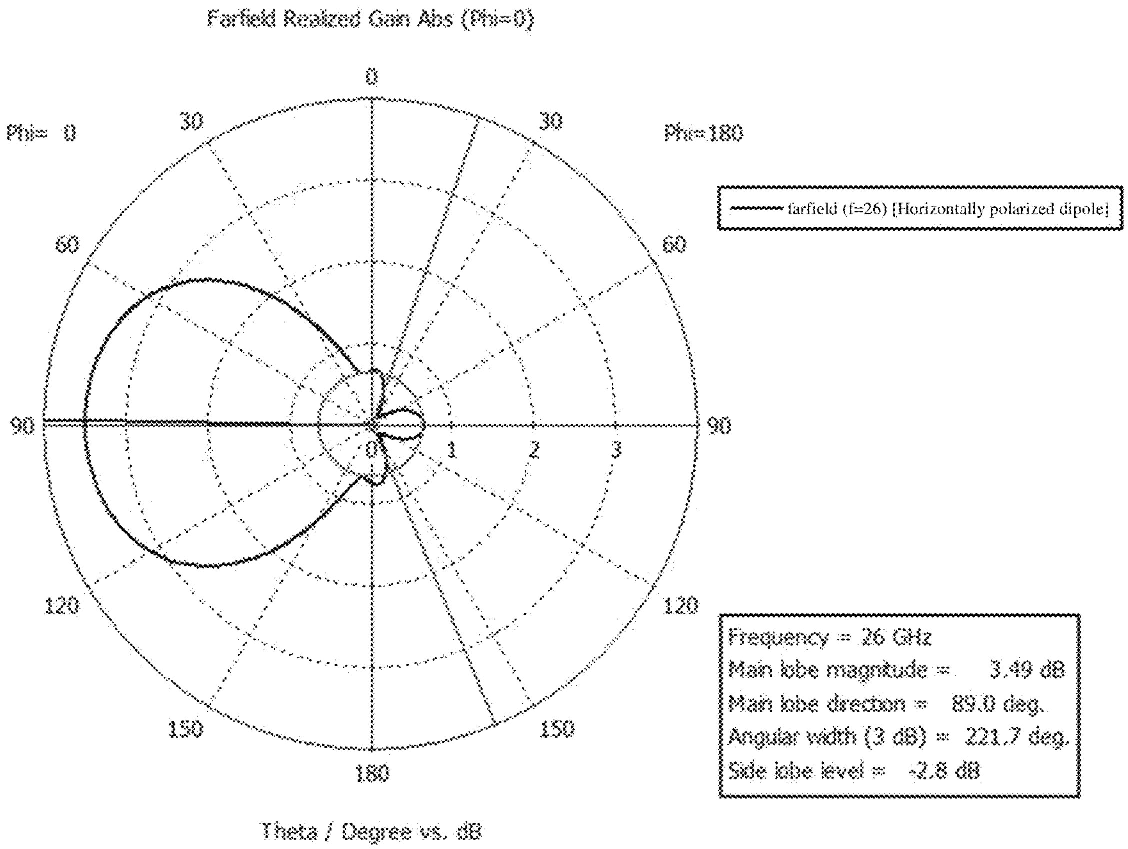
FIG. 11 is a directional diagram of a 26 GHz horizontally polarized dipole of an antenna element according to an embodiment of the present disclosure.
Figure 12:
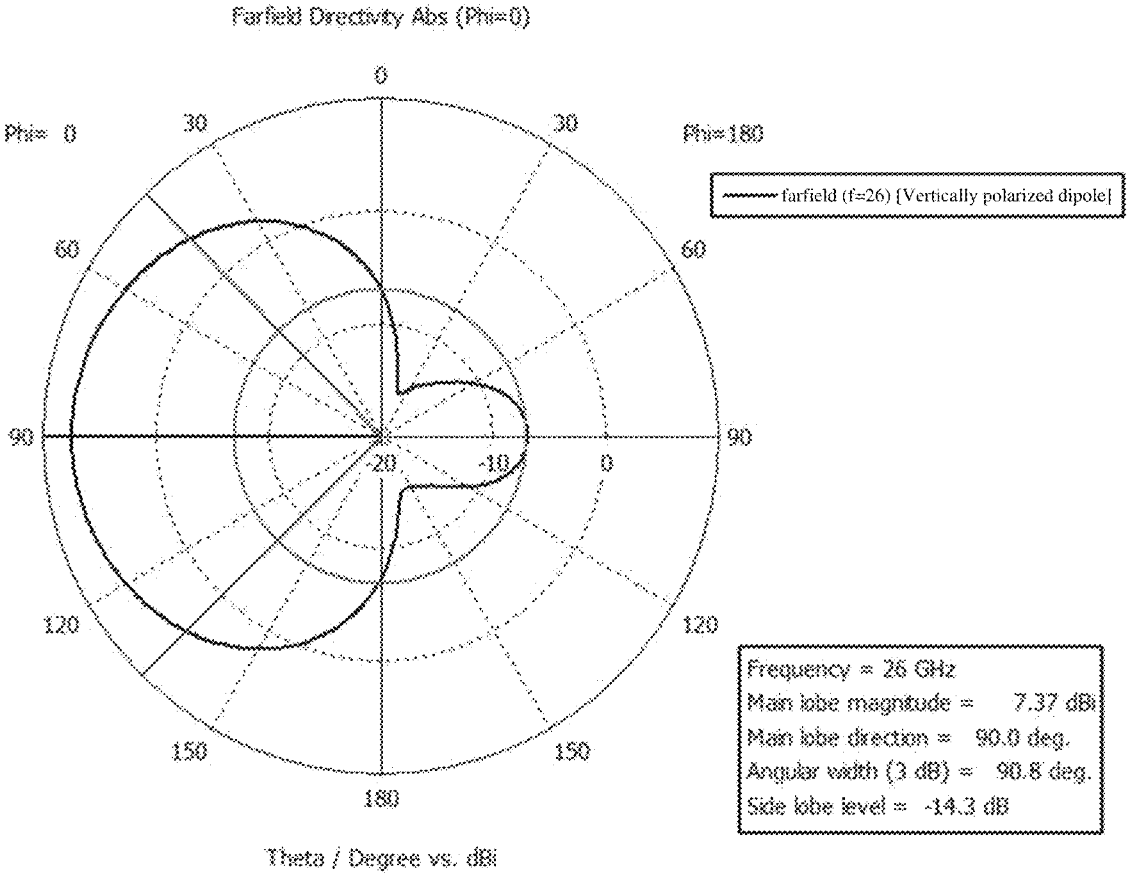
FIG. 12 is a directional diagram of a 26 GHz vertically polarized dipole of an antenna element according to an embodiment of the present disclosure.
Figure 13:
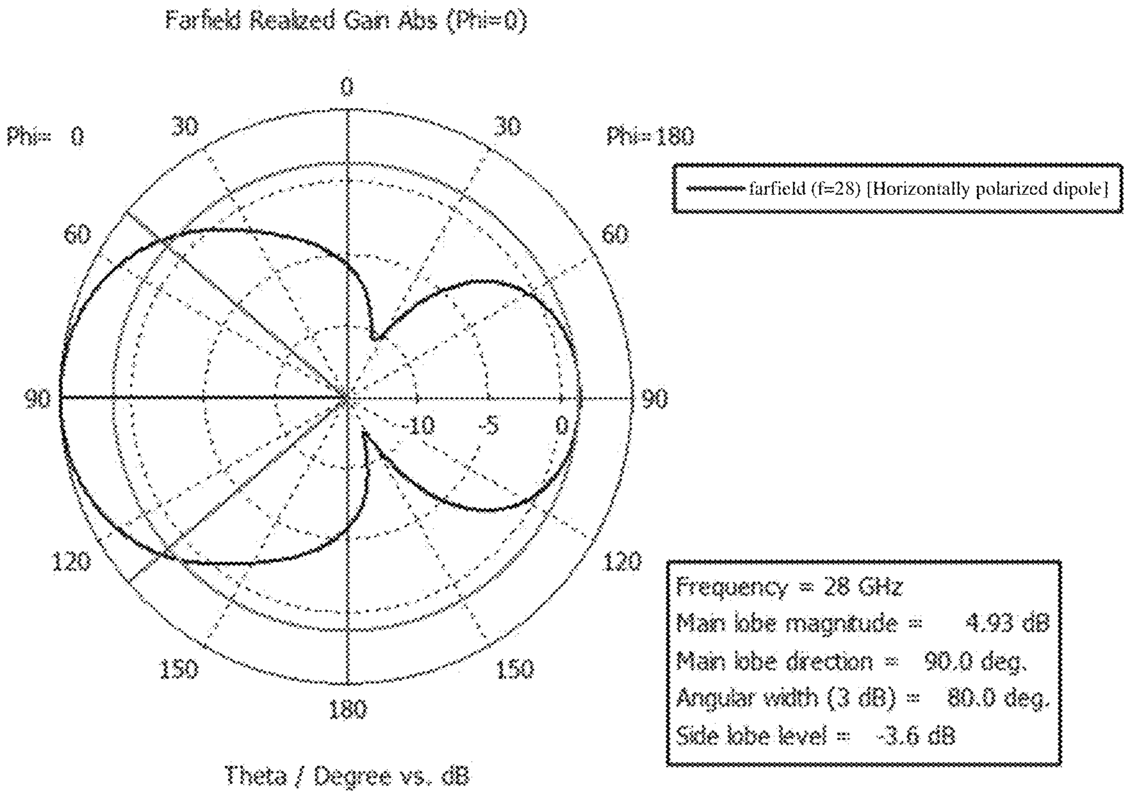
FIG. 13 is a directional diagram of a 28 GHz horizontally polarized dipole of an antenna element according to an embodiment of the present disclosure.
Figure 14:
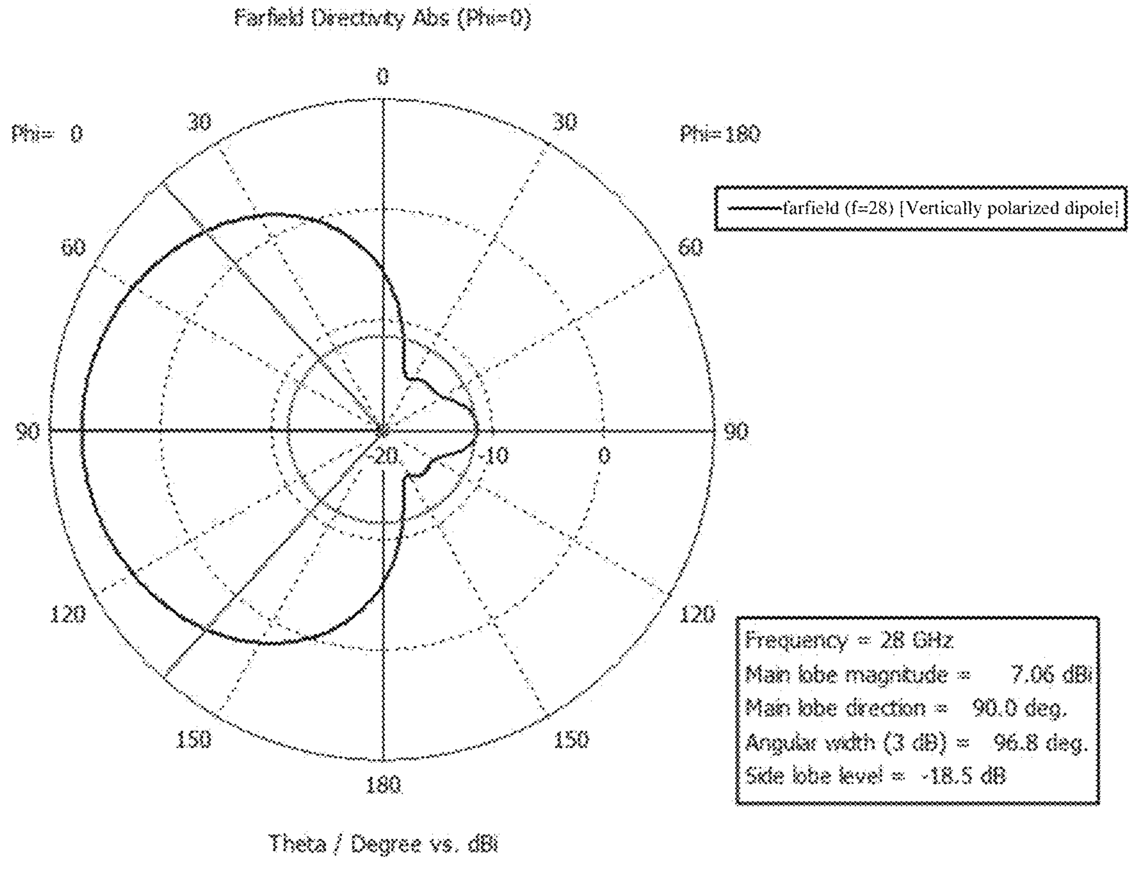
FIG. 14 is a directional diagram of a 28 GHz vertically polarized dipole of an antenna element according to an embodiment of the present disclosure.
Figure 15:
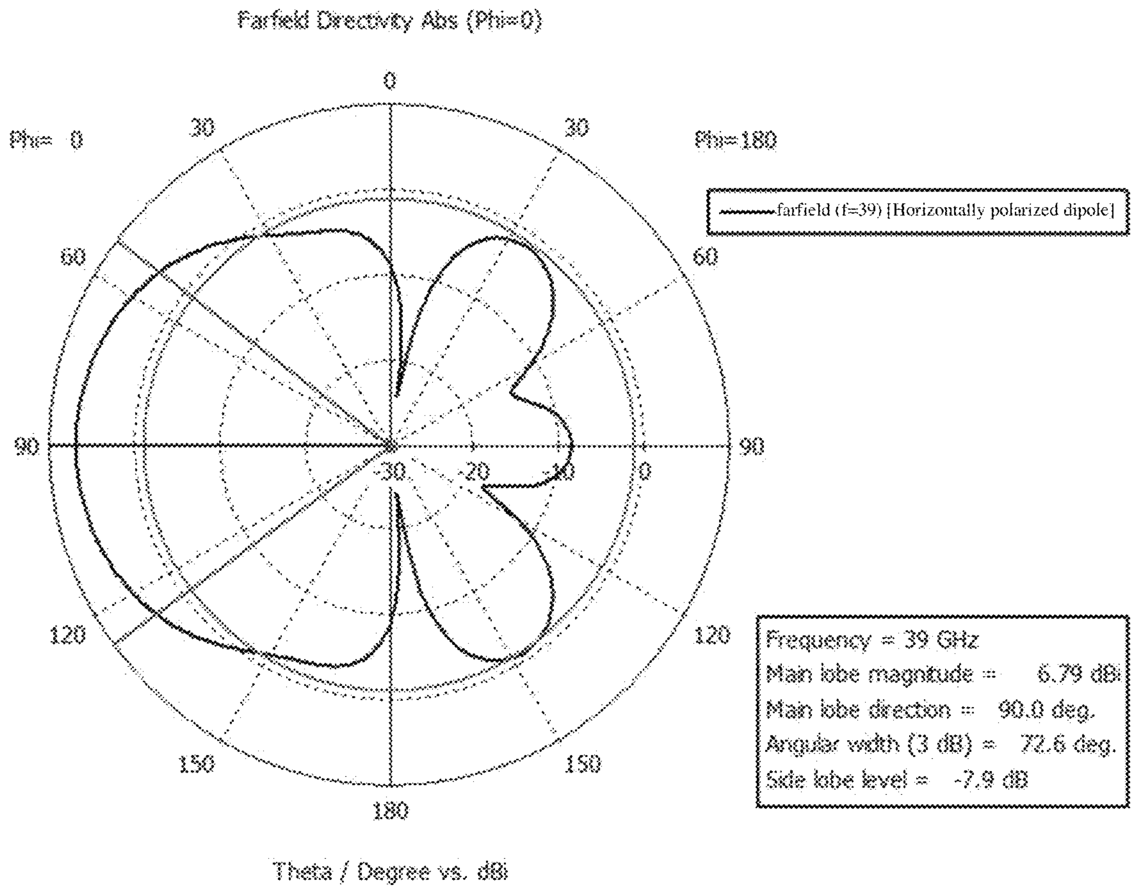
FIG. 15 is a directional diagram of a 39 GHz horizontally polarized dipole of an antenna element according to an embodiment of the present disclosure.
Figure 16:
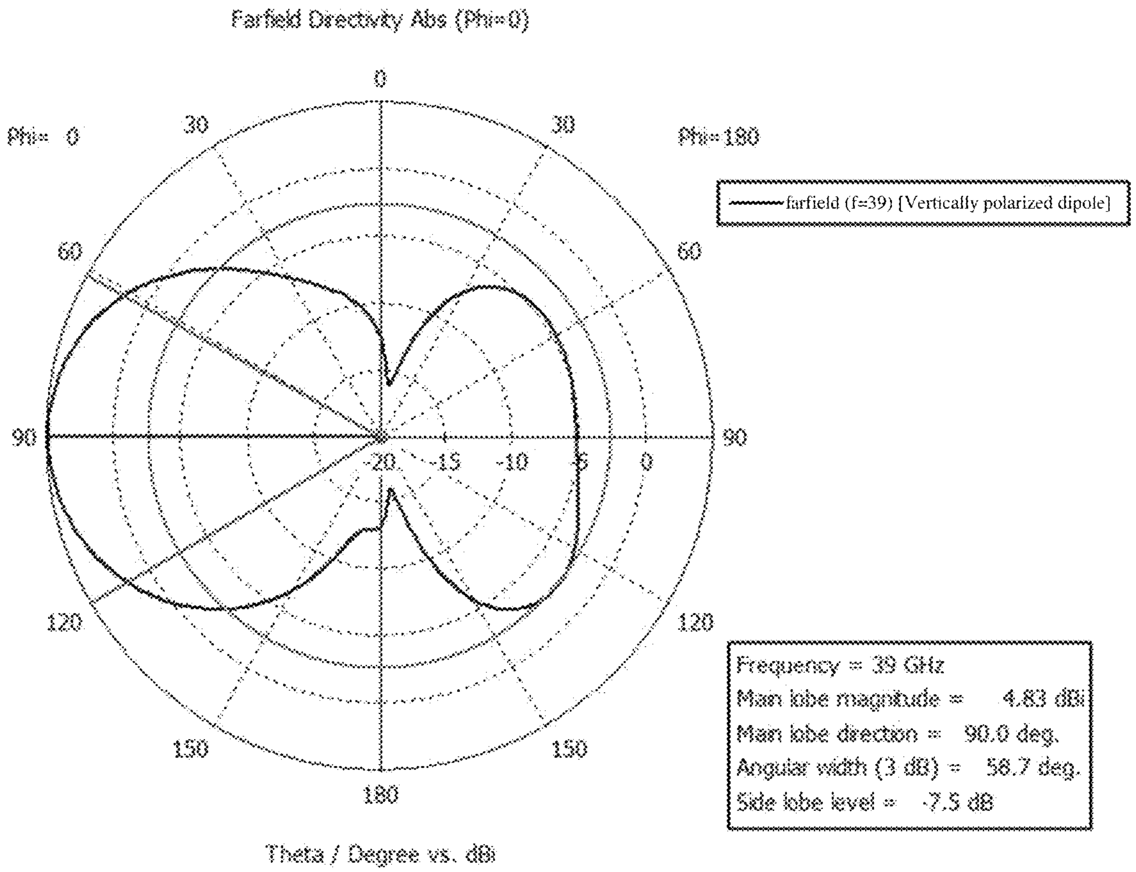
FIG. 16 is a directional diagram of a 39 GHz vertically polarized dipole of an antenna element according to an embodiment of the present disclosure.

For example, reference frequencies of the vertically polarized dipole antenna 2 and the horizontally polarized dipole antenna 5 are 28.0 GHz. It can be learned from a reflection coefficient diagram shown in FIG. 10 that common bandwidth of parameters S of the horizontally polarized dipole antenna and the vertically polarized dipole at −10 dB is 26.3 GHz to 29.5 GHz and 36.2 GHz to 41.5 GHz, and common bandwidth of parameters S at −6 dB is 24.2 GHz to 30.8 GHz and 34.7 GHz to 42.3 GHz, which basically covers global mainstream 5G millimeter wave bands n257, n260, and n261 defined in 3GPP, and a roaming band may cover n258.

FIG. 11 to FIG. 16 show directional patterns corresponding to dual-polarized dipole antennas at frequencies 26.0 GHz, 28.0 GHz, and 39.0 GHz. It can be seen from the figures that the figures are all end-to-end radiation patterns with less backward radiation.

As described above, if the ground plate 11 is disposed in a part of the area of the substrate 1, for example, a left area of the substrate 1, a right area of the substrate 1 is the clean area 12. In this way, the entire reflector 3 may be disposed in an area in which the ground plate 11 is located, the third antenna branch 21 and the fourth antenna branch 22 may be disposed in the clean area 12, and the second feeding structure 4 extends from the clean area 12 to the area in which the ground plate 11 is located.

Optionally, each reflection pillar 31 passes through the ground plate 11, and a distance between the reflection pillar 31 and the concave side edge 11*a* is less than a distance between the reflection pillar 31 and an opposite side edge of the concave side edge 11*a*. In other words, each reflection pillar 31 is disposed near the concave side edge 11*a* of the ground plate 11, or each reflection pillar 31 is located in an edge area of the ground plate 11 near the clean area 12. In this way, in one aspect, a distance between the reflector 3 and the vertically polarized dipole antenna 2 may be pulled close to each other, so that a reflection effect of the reflector 3 for the vertically polarized dipole antenna 2 is improved, and a front-to-rear ratio of a directional pattern of the vertically polarized dipole antenna 2 is improved. In another aspect, horizontal space of an area of the ground plate 11 occupied by the entire reflector 3 can be reduced, and more areas of the ground plate 11 may be reserved for use by another component.

Optionally, the reflection pillars 31 on two sides of the reflector 3 are located at an interface between the ground plate 11 and the clean area 12, or some of the reflection pillars 31 on the two sides of the reflector 3 are located in the area in which the ground plate 11 is located, and some are located in the clean area 12.

Distances between adjacent reflection pillars 31 of the reflector 3 may be equal, or may be partly equal. To improve a reflection effect of the reflector 3, a distance between adjacent reflection pillars 31 should not be excessively large. If a related component needs to pass through adjacent reflection pillars 31 of the reflector 3, a distance between the adjacent reflection pillars 31 may be appropriately increased, and a distance between other adjacent reflection pillars 31 may be relatively reduced. FIG. 1, FIG. 3, and the like show an implementation in which a distance between two middle reflection pillars 31 of the reflector 3 is relatively large, and distances between other adjacent reflection pillars 31 are equal.

Optionally, the central axis of the third antenna branch 21 and the central axis of the fourth antenna branch 22 pass through the focus of the parabola. In this way, a gain of the vertically polarized dipole antenna 2 can be improved, and a front-to-rear ratio of a directional pattern of the vertically polarized dipole antenna 2 can be improved.

Optionally, the third antenna branch 21 and the fourth antenna branch 22 are symmetrical about a plane on which the first antenna branch 51 and the second antenna branch 52 are disposed.

The first antenna branch 51 and the second antenna branch 52 are symmetrical about the third antenna branch 21 and the fourth antenna branch 22.

It is seen from an overall structure that, the two antenna branches of the horizontally polarized dipole antenna are inserted into a middle location between the two antenna branches of the vertically polarized dipole antenna, and the two antenna branches of the vertically polarized dipole antenna are inserted into a middle location between the two antenna branches of the horizontally polarized dipole antenna. Strict symmetry in the horizontal direction and the vertical direction is maintained in the overall structure, so that an angle offset in a main radiation direction of the directional pattern can be prevented.

Optionally, the second feeding structure 4 includes:

a third feeding point 41, where the third feeding point 41 is electrically connected to the ground plate 11;

a third feeder 42, where one end of the third feeder 42 is electrically connected to the third antenna branch 21, and another end of the third feeder 42 is electrically connected to the third feeding point 41;

a fourth feeding point 43, where the fourth feeding point 43 is electrically connected to the ground plate 11; and a fourth feeder 44, where one end of the fourth feeder 44 is electrically connected to the fourth antenna branch 22, and another end of the fourth feeder 44 is electrically connected to the fourth feeding point 43.

In the foregoing feeding structures of the vertically polarized dipole antenna 2 and the horizontally polarized dipole antenna 5, that is, the second feeding structure 4 and the first feeding structure 6 use two ends to perform feeding, and amplitudes of signal sources connected to two feeders in each feeding structure are equal, and a phase difference is 180°. In other words, the vertically polarized dipole antenna 2 and the horizontally polarized dipole antenna 5 use a differential feeding manner. Differential feeding can improve a common-mode suppression capability and an anti-interference capability of the antenna, improve differential end-to-end isolation, and improve polarization purity. In addition, relative to a single-end feeding structure, radiation power of the antenna can be increased.

Optionally, the two antenna branches of the vertically polarized dipole antenna 2 use coaxial differential feeding, and the two antenna branches of the horizontally polarized dipole antenna 5 use coaxial differential feeding.

In addition, if a multi-layer circuit substrate low temperature co-fired ceramic (LTCC) process is used for processing, or when the substrate 1 includes multiple layers of dielectric plates 13, a radio frequency integrated circuit (RFIC) chip may be buried in the dielectric plate 13, to directly feed the vertically polarized dipole antenna 2, thereby shortening lengths of the third feeder 42 and the fourth feeder 44 and reducing a loss.

The following describes a manner of disposing each component of the antenna element.

Optionally, as shown in FIG. 4 to FIG. 8, the substrate 1 includes N layers of dielectric plates 13, and N is greater than or equal to 4.

The first antenna branch 51 and the second antenna branch 52 are disposed in a same dielectric plates 13.

The third antenna branch 21 and the fourth antenna branch 22 are respectively disposed in two non-adjacent dielectric plates 13, and the third antenna branch 21 and the fourth antenna branch 22 pass through a corresponding dielectric plate 13.

The entire reflector 3 passes through the N layers of dielectric plates 13.

Optionally, each reflection pillar 31 of the reflector 3 passes through the N layers of dielectric plates 13.

The substrate 1 is disposed as multiple layers of dielectric plates 13. In this way, corresponding dielectric plates 13 may be processed to form the third antenna branch 21, the fourth antenna branch 22, and the reflector 3. In this way, a manufacturing process of the antenna element can be simplified. In addition, the substrate 1 is disposed as multiple layers of dielectric plates 13, so that the length of the third antenna branch 21, the length of the fourth antenna branch 22, and the length of the reflection pillar 31 can be conveniently controlled, and a distance between the third antenna branch 21 and the fourth antenna branch 22 can be more accurately controlled, so that lengths of the third antenna branch 21 and the fourth antenna branch 22 are as close to a quarter of a dielectric wavelength as possible, thereby improving performance of the antenna element.

In addition, each reflection pillar 31 of the reflector 3 passes through the N layers of dielectric plates 13, so that the vertically polarized dipole antenna 2 is located in a reflection area of the reflector 3, and a reflection effect can be improved.

It should be noted that the third antenna branch 21 and the fourth antenna branch 22 may not pass through the corresponding dielectric plate 13. Correspondingly, the reflector 3 may not pass through all layers of dielectric plates 13. For example, the substrate 1 has six layers of dielectric plates 13, and the outermost two layers of dielectric plates 13 are not used to dispose the third antenna branch 21 and the fourth antenna branch 22. In this case, the reflector 3 does not need to be disposed in the two layers of dielectric plates 13, or the reflector 3 does not need to pass through the outermost two layers of dielectric plates 13.

FIG. 4 to FIG. 8 show an implementation in which the substrate 1 includes four layers of dielectric plates 13, the third antenna branch 21 is disposed in the first layer of dielectric plate 13*a*, and the fourth antenna branch 22 is disposed in the fourth layer of dielectric plate 13*d*.

Optionally, the third antenna branch 21 and the fourth antenna branch 22 are formed by metal pillars that pass through a corresponding dielectric plate 13.

Each reflection pillar 31 of the reflector 3 is formed by several metal pillars that pass through the N layers of dielectric plates 13.

For example, a through-hole (not shown in the figure) that vertically passes through the dielectric plate 13 is disposed in a dielectric plate 13 corresponding to the third antenna branch 21 and the fourth antenna branch 22, and the third antenna branch 21 and the fourth antenna branch 22 are formed by metal pillars filled in the through-hole. The N layers of dielectric plates 13 are provided with several through-holes that pass through the N layers of dielectric plates 13 at intervals along a parabola, and each reflection pillar 31 of the reflector 3 is formed by metal pillars filled in the several through-holes.

The third antenna branch 21, the fourth antenna branch 22, and the reflection pillar 31 are formed by puncturing the dielectric plate 13 and placing a metal pillar in the hole. A process is simple and mature, and substantially no additional production costs are increased.

As described above, to reduce horizontal space of the area of the ground plate 11 occupied by the entire reflector 3 to reserve more areas of the ground plate 11 for use by other components, the entire reflector 3 may be located in an edge area of the ground plate 11 near the clean area 12.

In the foregoing disposing manner, the third feeding point 41 and the fourth feeding point 43 are located on a side of the reflector 3 that is far away from the vertically polarized dipole antenna 2, and the first feeding point 61 and the second feeding point 63 are located on a side of the reflector 3 that is far away from the horizontally polarized dipole antenna 5.

In this way, the third feeder 42, the fourth feeder 44, the first feeder 62, and the second feeder 64 all need to pass through a gap between the reflection pillars 31 of the reflector 3. Therefore, the gap between the reflection pillars 31 may be flexibly adjusted according to an arrangement manner of the feeders.

Optionally, the third feeder 42, the fourth feeder 44, the first feeder 62, and the second feeder 64 each pass through a gap between two adjacent reflection pillars 31 in the middle of the reflector 3 to corresponding feeding points. Therefore, the gap between the two adjacent reflection pillars 31 in the middle of the reflector 3 may be appropriately increased, so that each feeder can directly pass through the gap.

Optionally, in a horizontal direction (that is, a direction parallel to the substrate 1), the two antenna branches of the vertically polarized dipole antenna 2 are located in a middle location between the two antenna branches of the horizontally polarized dipole antenna 5. Therefore, in a horizontal direction, the third feeder 42 and the fourth feeder 44 are located between the first feeder 62 and the second feeder 64.

According to the implementation in which the substrate 1 includes multiple layers of dielectric plates 13, the following implementation may be used for disposing components of the foregoing dual-polarized dipole antenna.

As shown in FIG. 4 to FIG. 8, the substrate 1 includes four layers of dielectric plates 13.

The third antenna branch 21 is disposed in a first layer of dielectric plate 13*a*, and passes through the first layer of dielectric plate 13*a*.

The third feeder 42 is disposed in a surface of a second layer of dielectric plate 13*b* near the first layer of dielectric plate 13*a*.

The first antenna branch 51, the second antenna branch 52, the first feeder 62, the second feeder 64, and the ground plate 11 are all disposed in a surface of a third layer of dielectric plate 13*c* near the second layer of dielectric plate 13*b*.

The fourth feeder 44 is disposed in a surface of a fourth layer of dielectric plate 13*d* near the third layer of dielectric plate 13*c*.

The fourth antenna branch 22 is disposed in the fourth layer of dielectric plate 13*d*, and passes through the fourth layer of dielectric plate 13*d*.

The reflector 3 passes through the four layers of dielectric plates 13, that is, the reflector 3 passes through the first layer of dielectric plate 13*a* to the fourth layer of dielectric plate 13*d*.

The first antenna branch 51, the second antenna branch 52, and the ground plate 11 are all disposed in a same surface of a same dielectric plate 13, so that the ground plate 11 serves as a reflector of the first antenna branch 51 and the second antenna branch 52, and reflection performance of the ground plate 11 can be better improved.

It should be noted that in this implementation, in addition to disposing the ground plate 11 in a surface of the third layer of dielectric plate 13*c* near the second layer of dielectric plate 13*b*, the ground plate 11 may also be disposed in a surface of the fourth layer of dielectric plate 13*d* near the third layer of dielectric plate 13*c*. To ensure symmetry between the ground plate 11 and each antenna branch, and improve working performance of each antenna branch, the ground plate 11 may be disposed only in the surface of the third layer of dielectric plate 13*c* near the second layer of dielectric plate 13*b*.

In addition, the substrate 1 is disposed as a structure of multiple layers of dielectric plates 13. In this way, the dual-polarized dipole antenna can be well symmetrical by controlling a thickness of each layer of dielectric plate 13, and a process is simple and easy to implement.

Optionally, each reflection pillar 31 of the reflector 3 passes through the first layer of dielectric plate 13*a* to the fourth layer of dielectric plate 13*d*.

The antenna element in this embodiment of the present disclosure may be applied to wireless communication scenarios such as a wireless metropolitan area network (WMAN), a wireless wide area network (WWAN), a wireless local area network (WLAN), a wireless personal area network (WPAN), multiple-input multiple-output (MIMO), radio frequency identification (RFID), near field communication (NFC), wireless power consortium (WPC), and frequency modulation (FM). The antenna element in this embodiment of the present disclosure may be further applied to a regulatory test, design, and application of compatibility with a wearing electronic component (such as a hearing aid or a heart rate regulator) related to human safety and health such as an SAR and an HAC.

An embodiment of the present disclosure further relates to an electronic device, including the antenna element in any one of the embodiments of the present disclosure.

For an implementation of the antenna element in the electronic device, reference may be made to the foregoing descriptions, and a same technical effect can be achieved. To avoid repetition, details are not described again.

Figure 17:
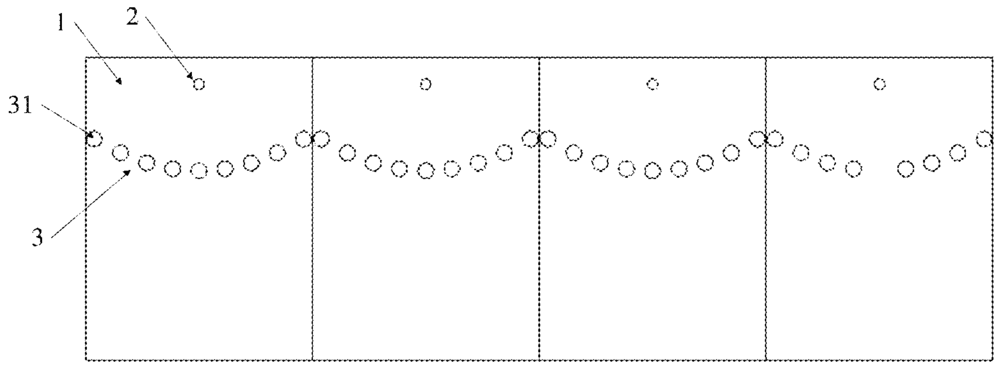
FIG. 17 is a first schematic structural diagram of an antenna array according to an embodiment of the present disclosure.

Optionally, as shown in FIG. 17, a quantity of antenna elements is greater than or equal to 2, and each antenna element is sequentially arranged to form an antenna array.

Figure 18:
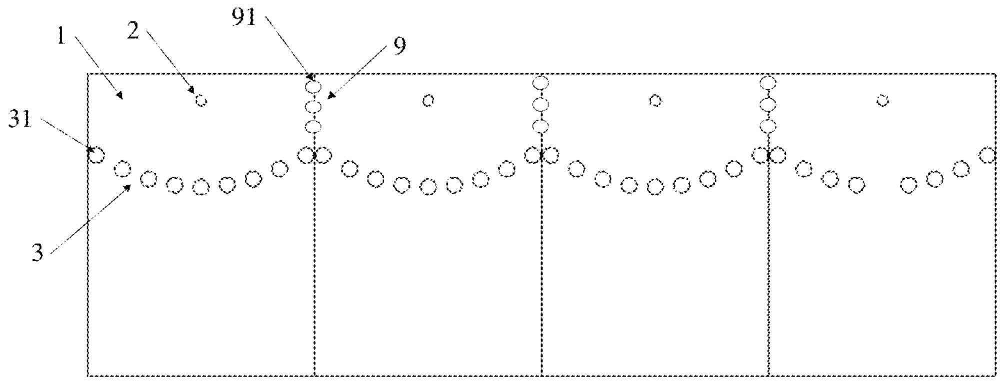
FIG. 18 is a second schematic structural diagram of an antenna array according to an embodiment of the present disclosure.

Optionally, as shown in FIG. 18, an isolator 9 is disposed between two adjacent antenna elements.

The isolator 9 is disposed between adjacent antenna elements, so that mutual coupling between adjacent antenna elements can be effectively reduced, and working performance of the antenna array is ensured.

Optionally, the isolator 9 includes several isolation pillars 91 arranged at intervals, and the isolation pillars 91 are perpendicular to the substrate 1 and pass through the substrate 1.

The electronic device may be a computer, a mobile phone, a tablet personal computer, a laptop computer, a personal digital assistant (PDA), a mobile internet device (MID), a wearable device, an e-book reader, a navigator, a digital camera, or the like.

The foregoing descriptions are merely implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An antenna element, comprising:

a substrate, wherein the substrate has a ground plate;

a horizontally polarized dipole antenna, wherein the horizontally polarized dipole antenna comprises a first antenna branch and a second antenna branch, the first antenna branch and the second antenna branch are disposed in the substrate at intervals, and the first antenna branch and the second antenna branch are disposed on a plane on which the ground plate is disposed; and a first feeding structure, wherein the first antenna branch and the second antenna branch are electrically connected to the ground plate through the first feeding structure; wherein the ground plate is spaced apart from both the first antenna branch and the second antenna branch, and a side edge of the ground plate that faces the first antenna branch and the second antenna branch is a concave side edge;

wherein the antenna element further comprises:

a vertically polarized dipole antenna, wherein the vertically polarized dipole antenna comprises a third antenna branch and a fourth antenna branch, and the third antenna branch and the fourth antenna branch are disposed in the substrate at intervals;

a reflector, wherein the reflector comprises several reflection pillars, and the several reflection pillars are arranged in the substrate at intervals along a parabola; and a second feeding structure, wherein the third antenna branch and the fourth antenna branch are electrically connected to the ground plate through the second feeding structure; wherein the first antenna branch, the second antenna branch, the third antenna branch, and the fourth antenna branch are all located on a side of the parabola where a focus of the parabola is located; and the third antenna branch and the fourth antenna branch are respectively located on two sides of a plane on which the first antenna branch and the second antenna branch are disposed, and the first antenna branch and the second antenna branch are respectively located on two sides of the third antenna branch and the fourth antenna branch.

2. The antenna element according to claim 1, wherein the first feeding structure comprises:

a first feeding point, wherein the first feeding point is electrically connected to the ground plate;

a first feeder, wherein one end of the first feeder is electrically connected to the first antenna branch, and another end of the first feeder is electrically connected to the first feeding point;

a second feeding point, wherein the second feeding point is electrically connected to the ground plate; and a second feeder, wherein one end of the second feeder is electrically connected to the second antenna branch, and another end of the second feeder is electrically connected to the second feeding point.

3. The antenna element according to claim 2, wherein the ground plate has a first feeder slot and a second feeder slot that communicate with the concave side edge; and the another end of the first feeder is electrically connected to the first feeding point through the first feeder slot, the another end of the second feeder is electrically connected to the second feeding point through the second feeder slot, and there is a gap between the ground plate and each of the first feeder and the second feeder.

4. The antenna element according to claim 3, wherein a shape of the concave side edge is an arc shape; or the concave side edge comprises a first straight segment located in an intermediate area and a second straight segment and a third straight segment that are located in areas on two sides, an included angle between the second straight segment and the first straight segment is an obtuse angle, and an included angle between the third straight segment and the first straight segment is an obtuse angle.

5. The antenna element according to claim 2, wherein a shape of the concave side edge is an arc shape; or the concave side edge comprises a first straight segment located in an intermediate area and a second straight segment and a third straight segment that are located in areas on two sides, an included angle between the second straight segment and the first straight segment is an obtuse angle, and an included angle between the third straight segment and the first straight segment is an obtuse angle.

6. The antenna element according to claim 1, wherein a shape of the concave side edge is an arc shape; or the concave side edge comprises a first straight segment located in an intermediate area and a second straight segment and a third straight segment that are located in areas on two sides, an included angle between the second straight segment and the first straight segment is an obtuse angle, and an included angle between the third straight segment and the first straight segment is an obtuse angle.

7. The antenna element according to claim 1, wherein the several reflection pillars pass through the ground plate, and a distance between the several reflection pillars and the concave side edge is less than a distance between the several reflection pillars and an opposite side edge of the concave side edge.

8. The antenna element according to claim 1, wherein a central axis of the third antenna branch and a central axis of the fourth antenna branch pass through the focus of the parabola.

9. The antenna element according to claim 1, wherein the third antenna branch and the fourth antenna branch are symmetrical about the plane on which the first antenna branch and the second antenna branch are disposed, and the first antenna branch and the second antenna branch are symmetrical about the third antenna branch and the fourth antenna branch.

10. The antenna element according to claim 1, wherein the substrate comprises N layers of dielectric plates, and N is greater than or equal to 4;

the first antenna branch and the second antenna branch are disposed in a same dielectric plate;

the third antenna branch and the fourth antenna branch are respectively disposed in two non-adjacent dielectric plates, and the third antenna branch and the fourth antenna branch pass through a corresponding dielectric plate; and the several reflection pillars pass through the N layers of dielectric plates.

11. The antenna element according to claim 1, wherein the second feeding structure comprises:

a third feeding point, wherein the third feeding point is electrically connected to the ground plate;

a third feeder, wherein one end of the third feeder is electrically connected to the third antenna branch, and another end of the third feeder is electrically connected to the third feeding point;

a fourth feeding point, wherein the fourth feeding point is electrically connected to the ground plate; and a fourth feeder, wherein one end of the fourth feeder is electrically connected to the fourth antenna branch, and another end of the fourth feeder is electrically connected to the fourth feeding point.

12. The antenna element according to claim 11, wherein the substrate comprises four layers of dielectric plates:

the third antenna branch is disposed in a first layer of dielectric plate, and passes through the first layer of dielectric plate;

the third feeder is disposed in a second layer of dielectric plate;

the first antenna branch, the second antenna branch, the first feeder, the second feeder, and the ground plate are all disposed in a third layer of dielectric plate;

the fourth feeder is disposed in a fourth layer of dielectric plate;

the fourth antenna branch is disposed in a fourth layer of dielectric plate, and passes through the fourth layer of dielectric plate; and the reflector passes through the four layers of dielectric plates.

13. The antenna element according to claim 1, wherein at least one of the vertically polarized dipole antenna or the horizontally polarized dipole antenna is a millimeter-wave antenna.

14. An electronic device, comprising at least two antenna elements; wherein an antenna element of the at least two antenna elements comprises:

a substrate, wherein the substrate has a ground plate;

a horizontally polarized dipole antenna, wherein the horizontally polarized dipole antenna comprises a first antenna branch and a second antenna branch, the first antenna branch and the second antenna branch are disposed in the substrate at intervals, and the first antenna branch and the second antenna branch are disposed on a plane on which the ground plate is disposed; and a first feeding structure, wherein the first antenna branch and the second antenna branch are electrically connected to the ground plate through the first feeding structure; wherein the ground plate is spaced apart from both the first antenna branch and the second antenna branch, and a side edge of the ground plate that faces the first antenna branch and the second antenna branch is a concave side edge;

wherein the antenna element further comprises:

a vertically polarized dipole antenna, wherein the vertically polarized dipole antenna comprises a third antenna branch and a fourth antenna branch, and the third antenna branch and the fourth antenna branch are disposed in the substrate at intervals;

a reflector, wherein the reflector comprises several reflection pillars, and the several reflection pillars are arranged in the substrate at intervals along a parabola; and a second feeding structure, wherein the third antenna branch and the fourth antenna branch are electrically connected to the ground plate through the second feeding structure; wherein the first antenna branch, the second antenna branch, the third antenna branch, and the fourth antenna branch are all located on a side of the parabola where a focus of the parabola is located; and the third antenna branch and the fourth antenna branch are respectively located on two sides of a plane on which the first antenna branch and the second antenna branch are disposed, and the first antenna branch and the second antenna branch are respectively located on two sides of the third antenna branch and the fourth antenna branch.

15. The electronic device according to claim 14, wherein the first feeding structure comprises:

a first feeding point, wherein the first feeding point is electrically connected to the ground plate;

a first feeder, wherein one end of the first feeder is electrically connected to the first antenna branch, and another end of the first feeder is electrically connected to the first feeding point;

a second feeding point, wherein the second feeding point is electrically connected to the ground plate; and a second feeder, wherein one end of the second feeder is electrically connected to the second antenna branch, and another end of the second feeder is electrically connected to the second feeding point.

16. The electronic device according to claim 15, wherein the ground plate has a first feeder slot and a second feeder slot that communicate with the concave side edge; and the another end of the first feeder is electrically connected to the first feeding point through the first feeder slot, the another end of the second feeder is electrically connected to the second feeding point through the second feeder slot, and there is a gap between the ground plate and each of the first feeder and the second feeder.

17. The electronic device according to claim 14, wherein the at least two antenna elements are sequentially arranged to form an antenna array.

* * * * *